United States Patent [19]
Tokuhiro et al.

[11] Patent Number: 5,920,431
[45] Date of Patent: Jul. 6, 1999

[54] OPTICAL MEMBER HAVING ANTIREFLECTION FILM THEREON

[75] Inventors: Setsuo Tokuhiro; Satoshi Nakano; Tatsuo Ohta, all of Hachioji, Japan

[73] Assignee: Konica Corporation, Tokyo, Japan

[21] Appl. No.: 08/879,984

[22] Filed: Jun. 20, 1997

[30] Foreign Application Priority Data

Jun. 27, 1996 [JP] Japan ................................. 8-167430

[51] Int. Cl.⁶ ...................................................... G02B 1/10
[52] U.S. Cl. ............................ 359/586; 359/580; 359/581
[58] Field of Search ............................... 359/580, 581, 359/586

[56] References Cited

U.S. PATENT DOCUMENTS

| 4,940,636 | 7/1990 | Brock et al. | 359/586 |
| 5,460,888 | 10/1995 | Hashimoto et al. | 359/580 |

*Primary Examiner*—Cassandra Spyrou
*Assistant Examiner*—Jennifer Winstedt
*Attorney, Agent, or Firm*—Frishauf, Holtz, Goodman, Langer & Chick, P.C.

[57] ABSTRACT

An optical member includes a synthetic resin substrate: and an antireflection film including at least a mixture film composed of tantalum oxide ($Ta_2O_5$) and titanium oxide ($TiO_2$), and a film having a refractive index lower than that of the mixture film. The antireflection film is coated on the synthetic resin substrate.

26 Claims, 9 Drawing Sheets

OPTICAL MEMBER HAVING ANTIREFLECTION FILM THEREON

BACKGROUND OF THE INVENTION

The present invention is related to an optical member having an antireflection film, more specifically an optical member having at least one mixture film on a substrate composed of a synthetic resin.

Conventionally, in using a synthetic resin as a substrate, has been known the optical member having on the aforesaid substrate an antireflection film which decreases surface reflection. The optical member having the antireflection film has been applied to and practiced in cameras, video cameras and the like. Further, the synthetic resins applied to the substrate include acryl resins, polycarbonate resins, etc. It is particularly noted that in the optical member having the antireflection film of which substrate is composed of the synthetic resin, the synthetic resin has less heat-resistance than optical glass, and as a result, it is impossible to employ the means of vacuum evaporation. Accordingly, there have been problems such that no good adhesion between the synthetic resin substrate and the antireflection film is obtained and a crack is liable to be formed on the anitreflection film.

Generally, it has been known that as a reason that the crack is liable to be formed on the optical member on which the antireflection film is formed, stress remaining in the antireflection film is one of causes. In order to make the formation of the crack less liable, as described, for example, in Optical Thin Film (H. A. Macleod, Japanese version translated by Shigetaro Ogura et al., page 458), there is provided a method wherein a few percent of an impurity is intentionally put into the film for the decrease in the stress in the film which is used as an antirefelction film. Furthermore, in more detail, Pulker studied the relationship between the stress of an optical thin film and the fine structure of the film, and obtained good agreement of the measurement results with those obtained by the calculation based on a model. It is also described that the presence of a small amount of the impurity affects remarkably the stress; furthermore, the impurity is concentrated to the boundary of crystal grains in the film having a prismatic structure; as a result, pulling force between grain boundaries adjacent each other is decreased to reduce the stress, and furthermore, the stress of a magnesium fluoride film is reduced approximately to 50 percent by the presence of a small amount of calcium fluoride such as about four mole percent.

On the basis of the above-mentioned approach, is disclosed an optical member having an antireflection film composed of a mixture film. For example, is known an optical member having an antireflection film composed of a mixture film consisting of $ZrO_2$ and $TiO_2$ or $ZrO_2$ and $TiO_2$ (refer to Japanese Patent Publication Open to Public Inspection No. 181902/1992).

However, when the optical member having the antireflection film composed of the mixture film is kept at high temperatures (for example, 70° C.), the crack is formed on the antireflection film and no sufficient effect for preventing the formation of the crack has been obtained.

SUMMARY OF THE INVENTION

In view of the foregoing problems, the present invention is accomplished. An object of the present invention is to provide an optical member having an antireflection film which is not liable to form the crack at high temperatures and has excellent antireflection properties.

The aforesaid object is accomplished by the following structures:

In structure (1), for an optical member having an antireflection film consisting of a substrate and the antireflection film, the object is accomplished by arranging on the synthetic resin substrate the antireflection film comprising at least one mixture film consisting of tantalum oxide ($Ta_2O_5$) and titanium oxide ($TiO_2$). Here, the synthetic resin may be of optical use. For example, acryl resin (PMMA), polycarbonate resin (PC), etc. are available and also available in the following structures.

In structure (2), an optical member having the antireflection film described in the structure (1) is characterized by comprising the aforesaid mixture film consisting of tantalum oxide ($Ta_2O_5$) and titanium oxide ($TiO_2$), which comprises from 0.5 to 30 weight percent of titanium oxide ($TiO_2$). Beyond these limits of the weight ratios, the crack will be liable to be formed.

In structure (3), an optical member having the antireflection film described in the structure (1) is characterized by comprising more preferably from 1 to 5 weight percent of titanium oxide ($TiO_2$).

In structure (4), an optical member having the antireflection films mentioned in one of structures (1) to (3) is characterized in that the aforesaid antireflection films are composed of two films which meet the following conditions, while the numbers of the aforesaid antireflection films are counted from the substrate side.

The first film: the aforesaid mixture film, $$1.90 \leq n_1 \leq 2.10$$

$$0.03\lambda_0 \leq n_1 d_1 \leq 0.10\lambda_0$$

The second film: having a refractive index lower than that of the mixture film, $$1.36 \leq n_2 \leq 1.48$$

$$0.28\lambda_0 \leq n_2 d_2 \leq 0.4\lambda_0$$

wherein $n_i$ is the refractive index of each of the films $d_i$ is the thickness of each of the films $\lambda_0$ is the design wavelength Beyond the limits, antireflection properties are deteriorated.

Further, the optical member of structure (4) satisfies the following conditions, $$7 \text{ nm} \leq d_1 \leq 27 \text{ nm}$$

$$96 \text{ nm} \leq d_2 \leq 150 \text{ nm}.$$

Still further, in the optical member of structure (4), the second film contains silicon oxide ($SiO_2$) or magnesium fluoride ($MgF_2$).

In structure (5), an optical member having antireflection films described in one of structures (1) to (3) is characterized in that the aforesaid antireflection films are composed of three films which meet the following conditions, while the numbers of the aforesaid antireflection films are counted from the substrate side.

The first film: having a refractive index lower than that of the mixture film, $1.36 \leq n_1 \leq 1.48$ $0.10\lambda_0 \leq n_1 d_1 \leq 0.60\lambda_0$ The second film: the aforesaid mixture film, $1.90 \leq n_2 \leq 2.10$ $0.30\lambda_0 \leq n_2 d_2 \leq 0.10\lambda_0$ The third film: having a refractive index lower than that of the mixture film, $1.36 \leq n_3 \leq 1.48$ $0.28\lambda_0 \leq n_3 d_3 \leq 0.40\lambda_0$ Beyond the limits, antireflection properties are deteriorated.

Further, the optical member of structure (5) satisfies the following conditions, $34 \text{ nm} \leq d_1 \leq 225 \text{ nm}$ $7 \text{ nm} \leq d_2 \leq 27 \text{ nm}$ $96 \text{ nm} \leq d_3 \leq 150 \text{ nm}.$ Still further, in the optical member of structure (5), the first or third film contains silicon oxide ($SiO_2$) or magnesium fluoride ($MgF_2$).

In structure (6), an optical member having antireflection films mentioned in one of structures (1) to (3) is characterized in that the aforesaid antireflection films are composed of four films which meet the following conditions, while the numbers of the aforesaid antireflection films are counted from the substrate side.

The first film: the aforesaid mixture film, $1.90 \leq n_1 \leq 2.10$ $0.02\lambda_0 \leq n_1 d_1 \leq 0.15\lambda_0$ The second film: having a refractive index lower than that of the mixture film, $1.36 \leq n_2 \leq 1.48$ $0.03\lambda_0 \leq n_2 d_2 \leq 0.18\lambda_0$ The third film: the aforesaid mixture film, $1.90 \leq n_3 \leq 2.10$ $0.09\lambda_0 \leq n_3 d_3 \leq 0.32\lambda_0$ The fourth film: having a refractive index lower than that of the mixture film, $1.36 \leq n_4 \leq 1.48$ $0.22\lambda_0 \leq n_4 d_4 \leq 0.40\lambda_0$ Beyond the limits, antireflection properties are deteriorated.

Further, the optical member of structure (6) satisfies the following conditions, $4 \text{ nm} \leq d_1 \leq 41 \text{ nm}$ $11 \text{ nm} \leq d_2 \leq 68 \text{ nm}$ $22 \text{ nm} \leq d_3 \leq 86 \text{ nm}$ $75 \text{ nm} \leq d_4 \div 150 \text{ nm}$ Still further, in the optical member of structure (6), the second or fourth film contains silicon oxide ($SiO_2$) or magnesium fluoride ($MgF_2$).

In structure (7), is an optical member having antireflection films mentioned in one of structures (1) to (3) is characterized in that the aforesaid antireflection films are composed of five films which meet the following conditions, while the numbers of the aforesaid antireflection films are counted from the substrate side.

The first film: having a refractive index lower than that of the mixture film, $1.36 \leq n_1 \leq 1.48$ $0.10\lambda_0 \leq n_1 d_1 \leq 0.60\lambda_0$ The second film: the aforesaid mixture film, $1.90 \leq n_2 \leq 2.10$ $0.02\lambda_0 \leq n_2 d_2 \leq 0.15\lambda_0$ The third film: having a refractive index lower than that of the mixture film, $1.36 \leq n_3 \leq 1.48$ $0.03\lambda_0 \leq n_3 d_d \leq 0.18\lambda_0$ The fourth film: the aforesaid mixture film $1.90 \leq n_4 \leq 2.10$ $0.09\lambda_0 \leq n_4 d_4 \div 0.32\lambda_0$ The fifth film: having a refractive index lower than that of the mixture film, $1.36 \leq n_5 \leq 1.48$ $0.22\lambda_0 \leq n_5 d_5 \leq 0.40\lambda_0$ Beyond the limits, antireflection properties are deteriorated.

Further, the optical member of structure (7) satisfies the following conditions, $34 \text{ nm} \leq d_1 \leq 225 \text{ nm}$ $4 \text{ nm} \leq d_2 \leq 41 \text{ nm}$ $11 \text{ nm} \leq d_3 \leq 68 \text{ nm}$ $22 \text{ nm} \leq d_4 \leq 86 \text{ nm}$ $75 \text{ nm} \leq d_5 \leq 150 \text{ nm}$ Still further, in the optical member of structure (7), the first, third or fifth film contains silicon oxide ($SiO_2$) or magnesium fluoride ($MgF_2$).

In structure (8), an optical member having antireflection films described in one of structures (1) to (3), comprises at least each one of mixture films consisting of tantalum oxide ($Ta_2O_3$) and titanium oxide ($TiO_2$), aforesaid film having the refractive index lower than that of the mixture film and an intermediate refractive index film having a refractive index of 1.58 to 1.62.

Further, aforesaid film having the refractive index lower than that of the mixture film contains silicon oxide ($SiO_2$) or magnesium fluoride ($MgF_2$).

Still further, the intermediate refractive index film contains aluminum oxide ($Al_2O_3$).

In structure (9), an optical member having antireflection films described in one of structures (1), (2), (3) and (8), is characterized in that the aforesaid antireflection films are composed of by six films which meet the following conditions, while the numbers of the aforesaid antireflection films are counted from the substrate side.

The first film: the aforesaid intermediate refractive index film, $1.58 \leq n_1 \leq 1.62$ $0.05\lambda_0 \leq n_1 d_1 \leq 0.30\lambda_0$ The second film: having a refractive index lower than that of the mixture film, $1.36 \leq n_2 \leq 1.48$ $0.10\lambda_0 \leq n_2 d_2 \leq 0.60\lambda_0$ The third film: the aforesaid mixture film $1.90 \leq n_3 \leq 2.10$ $0.02\lambda_0 \leq n_3 d_3 \leq 0.08\lambda_0$ The fourth film: having a refractive index lower than that of the mixture film, $1.36 \leq n_4 \leq 1.48$ $0.10\lambda_0 \leq n_4 d_4 \leq 0.18\lambda_0$ The fifth film: the aforesaid mixture film, $1.90 \leq n_5 \leq 2.10$ $0.09\lambda_0 \leq n_5 d_5 \leq 0.35\lambda_0$ The sixth film: having a refractive index lower than that of the mixture film, $1.36 \leq n_6 \leq 1.48$ $0.22\lambda_0 \leq n_6 d_6 \leq 0.40\lambda_0$ Beyond the limits, antireflection properties are deteriorated.

Further, the optical member of structure (9) satisfies the following conditions, $15 \text{ nm} \leq d_1 \leq 97 \text{ nm}$ $34 \text{ nm} \leq d_2 \leq 225 \text{ nm}$ $4 \text{ nm} \leq d_3 \leq 22 \text{ nm}$ $34 \text{ nm} \leq d_4 \leq 68 \text{ nm}$ $22 \text{ nm} \leq d_5 \leq 94 \text{ nm}$ $75 \text{ nm} \leq d_6 \leq 150 \text{ nm}$ Still further, in the optical member of structure (9), the second film contains silicon oxide ($SiO_2$) or magnesium fluoride ($MgF_2$).

Still further, in the optical member of structure (9), the first film contains aluminum oxide ($Al_2O_3$).

DETAILED DESCRIPTION OF THE PREFERRED EMBODIMENT

Example

Figure 2:
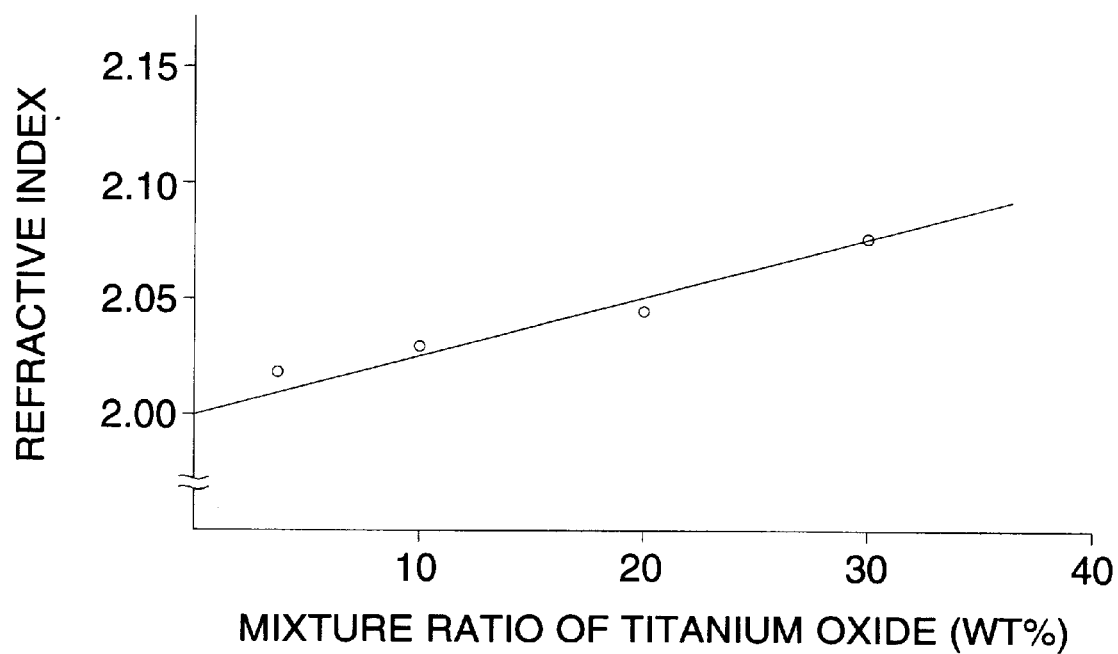
FIG. 2 shows the relationship between weight ratio of a mixture film and refractive index.

In the following, Examples of the present invention are explained. Further, the weight ratio of titanium oxide ($TiO_2$) to tantalum oxide ($Ta_2O_5$) is converted using the correlation diagram of weight ratio versus refractive index in FIG. 2.

Experimental Apparatus

For the preparation of the antireflection film, a vacuum evaporation method was employed. A vacuum vessel was evacuated up to $2.0 \times 10^{-2}$ Pa, and materials were heated by an electron gun and evaporated to prepare a film. Further, during the preparation of the film, as reactive gas, oxygen was introduced up to $1.5 \times 10^{-2}$ Pa at the total pressure. In addition, the evaporation was performed without heating particularly a substrate. For the preparation of a mixture film consisting of tantalum oxide ($Ta_2O_3$) and titanium oxide ($TiO_2$), in the present invention, individual materials were mixed according to the predetermined weight ratio, followed by melting, cooling and crashing and the resulting mixture was employed as a material for evaporation. The optical member obtained was left alone in ambient conditions of 60° C. and 90% relative humidity for 240 hours, and 70° C. (drying) for eight hours. Further, individual materials may be evaporated by another evaporation source (2-element simultaneous evaporation) and an intended mixture film may be prepared while regulating evaporation rate.

Evaluation Method

An evaluation item is of crack. The crack was visually inspected under a reflection-type optical microscope (40 times).

Cracks in Examples and Comparative Examples were evaluated in accordance with the following criteria.

a: no formation of crack
b: formation of pale streak-like crack
c: formation of tortoiseshell-like crack Methods for measuring refractive index and film thickness The film thickness is measured as follows. A sample (material to be measured) is cut perpendicularly against an antireflection film and the cross section is enlarged by an SEM (scanning-type electron microscopy) and the film thickness is measured.

The refractive index is obtained as follows. Materials composing each antireflection film are analyzed by an X-ray electron spectroscopy and the refractive index can be retrieved from the known references (for example, Kogaku Hakumaku (Optical Thin Film) Kyoritsu Shuppan).

The refractive index of a mixture film is obtained as follows.

Figure 1:
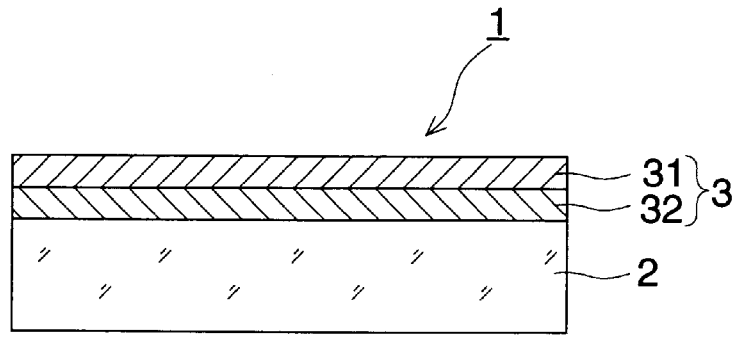
FIG. 1 shows a film structure of Example.

(1) Analysis of composition ratio of materials in the mixture film by the X-ray electron spectroscopy
(2) Retrieval of refractive index of each material composing the mixture film from the known references
(3) The refractive index of the mixture film is obtained as the total of products of refractive index of each material by composition ratio Example A Examples of the present invention are explained. FIG. 1 is a cross section of an optical member 1 having an antireflection film of the present invention. In FIG. 1, the optical member 1 having the antireflection film is composed of a synthetic resin substrate 2 and the antireflection film 3, which is composed of a first antireflection film 31 and a second antireflection film 32.

Preparation of Samples

Samples of Example A are of Example 1 and of Comparative Examples 1, 2 and 3. Table 1 illustrates materials for the substrates and antireflection films, optical film thickness and film structures.

Test Results

Figure 3:
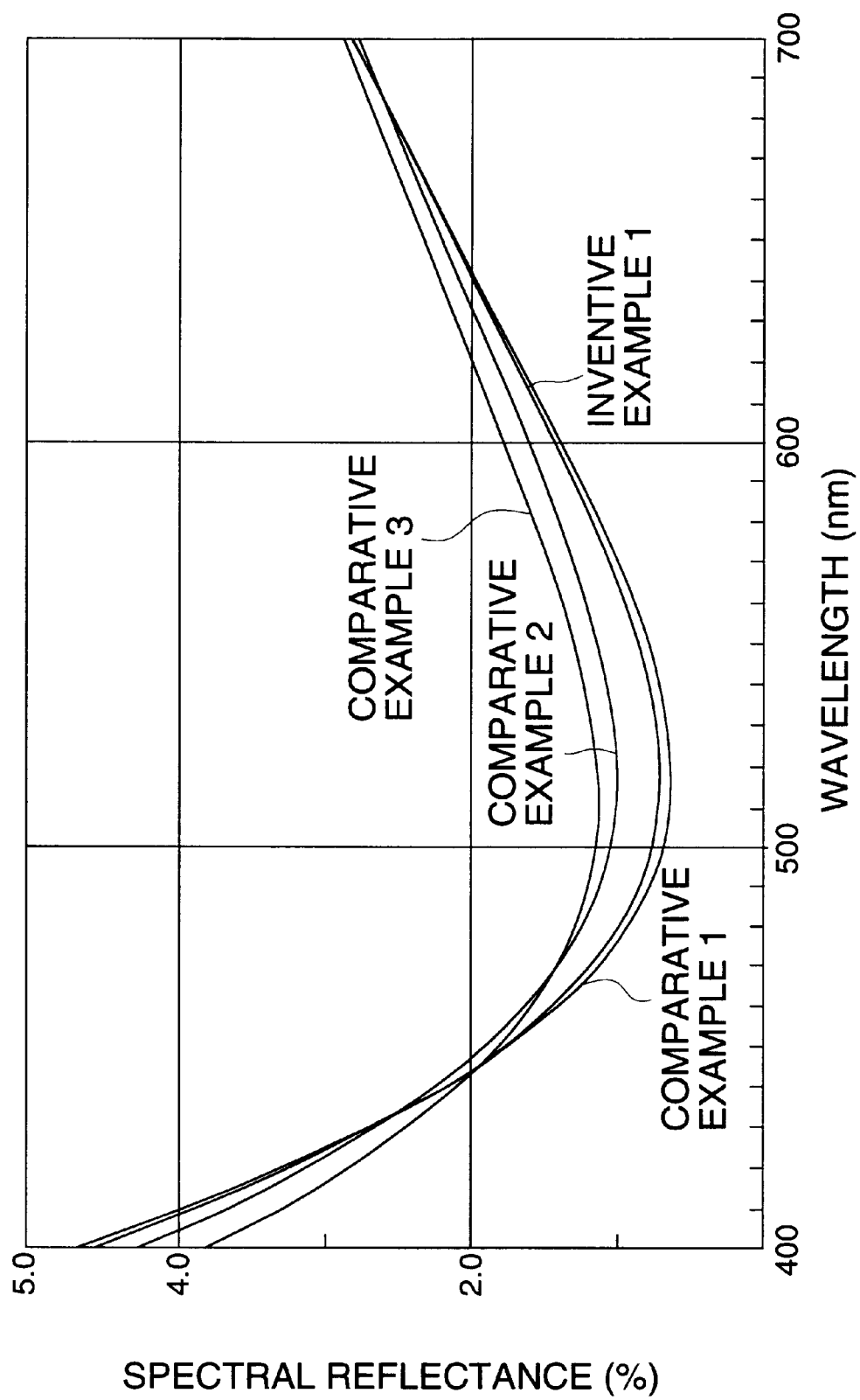
FIG. 3 shows the spectral reflectance of the optical member having the antireflection film of Example A.

Table 2 shows test results on the aforesaid samples. Furthermore, FIG. 3 illustrates antireflection characteristics (spectral reflectance) measured by a spectrophotometer.

TABLE 2

|  | Example 1 | Comparative Example 1 | Comparative Example 2 | Comparative Example 3 |
|---|---|---|---|---|
| 60° C. 90% RH 240 H | a | a | a | a |
| 70° C. Drying | a | b | c | b |

Table 2 shows that no significant difference in the formation of the crack is found between the sample of Example 1 and samples of Comparative Examples 1, 2 and 3, when the samples are stored at 60° C. and 90% relative humidity for 240 hours but during the storage at 70° C. (drying), the sample of Example 1 of the present invention has only formed no crack.

Example B

Samples of Example B are of Example 1 and of Comparative Examples 4, 5 and 6. Table 3 shows materials for substrates and antireflection films, film thickness and film structures.

TABLE 1

|  | Example 1 PMMA | | | Comparative Example 1 PMMA | | | Comparative Example 2 PMMA | | | Comparative Example 3 PMMA | | |
|---|---|---|---|---|---|---|---|---|---|---|---|---|
|  | Material | Optical Thickness | Refractive Index | Material | Optical Thickness | Refractive Index | Material | Optical Thickness | Refractive Index | Material | Optical Thickness | Refractive Index |
| First Film | $Ta_2O_5$ (97 wt %) $TiO_2$ (3 wt %) | $0.05\lambda_0$ | 2.02 | $Ta_2O_5$ | $0.50\lambda_0$ | 2.00 | $TiO_2$ | $0.05\lambda_0$ | 2.15 | $ZrO_2$ | $0.06\lambda_0$ | 1.82 |
| Second Film | $SiO_2$ | $0.35\lambda_0$ | 1.46 | $SiO_2$ | $0.35\lambda_0$ | 1.46 | $SiO_2$ | $0.35\lambda_0$ | 1.46 | $SiO_2$ | $0.34\lambda_0$ | 1.46 |

Note: Design wavelength $\lambda_0$ = 510 nm

TABLE 3

| | Example 2 PMMA | | | Comparative Example 4 PMMA | | | Comparative Example 5 PMMA | | | Comparative Example 6 PMMA | | |
|---|---|---|---|---|---|---|---|---|---|---|---|---|
| | Material | Optical Thickness | Refractive Index | Material | Optical Thickness | Refractive Index | Material | Optical Thickness | Refractive Index | Material | Optical Thickness | Refractive Index |
| First Film | $SiO_2$ | $0.15\lambda_0$ | 1.46 | $SiO_2$ | $0.15\lambda_0$ | 1.46 | $SiO_2$ | $0.15\lambda_0$ | 1.46 | $SiO_2$ | $0.15\lambda hd\ 0$ | 1.46 |
| Second Film | $Ta_2O_5$ (97 wt %) $TiO_2$ (3 wt %) | $0.05\lambda_0$ | 2.02 | $Ta_2O_5$ | $0.05\lambda_0$ | 2.00 | $TiO_2$ | $0.05\lambda_0$ | 2.15 | $ZrO_2$ | $0.07\lambda_0$ | 1.82 |
| Third Film | $SiO_2$ | $0.36\lambda_0$ | 1.46 | $SiO_2$ | $0.36\lambda_0$ | 1.46 | $SiO_2$ | $0.36\lambda_0$ | 1.46 | $SiO_2$ | $0.35\lambda_0$ | 1.46 |

Note: Design wavelength $\lambda_0 = 510$ nm

Test Results

Figure 4:
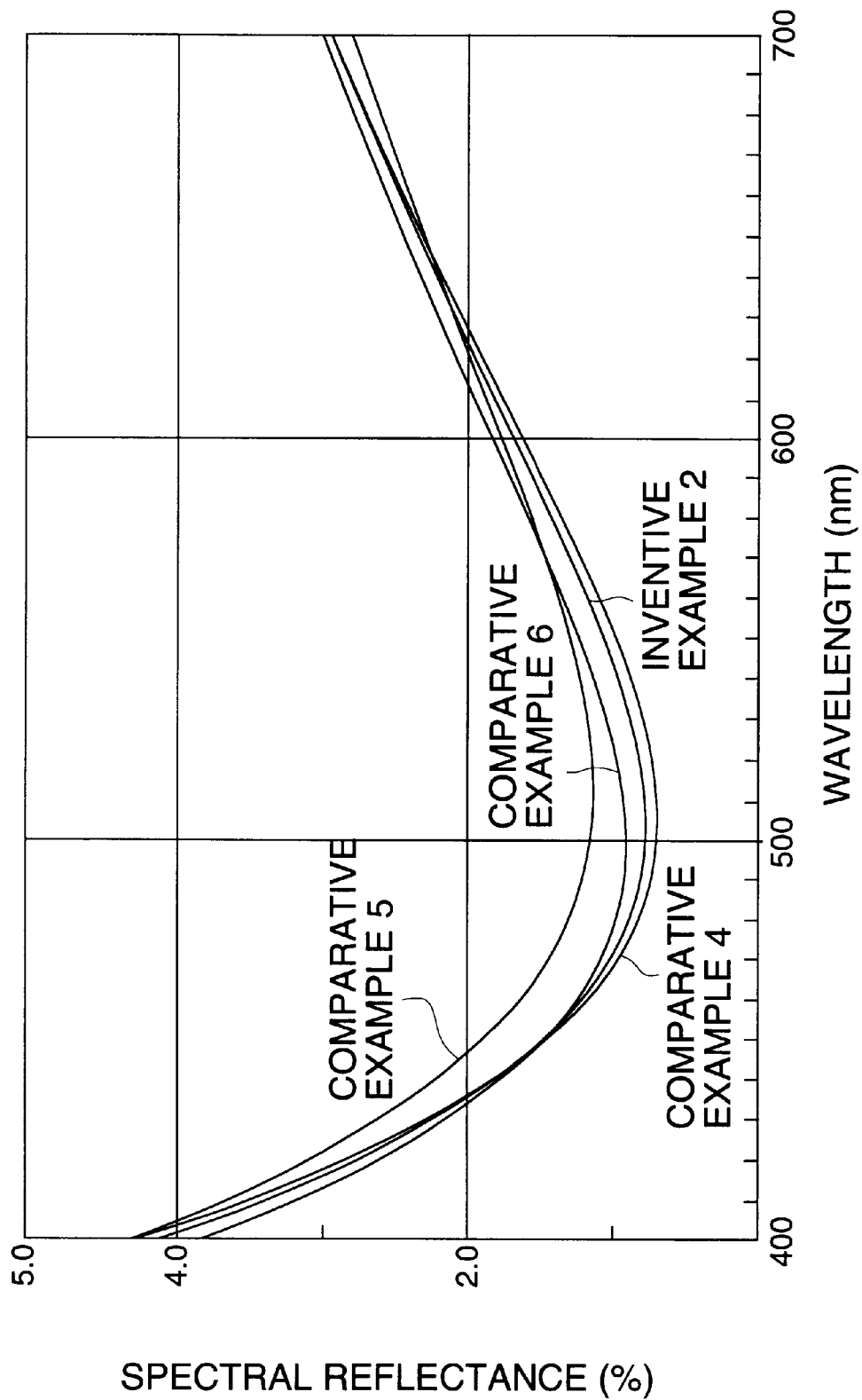
FIG. 4 shows the spectral reflectance of the optical member having the antireflection film of Example B.

Table 4 shows test results on the aforementioned samples. Further, FIG. 4 illustrates the antireflection characteristics (spectral reflectance) measured by a spectrophotometer.

TABLE 4

| | Example 2 | Comparative Example 4 | Comparative Example 5 | Comparative Example 6 |
|---|---|---|---|---|
| 60° C. 90% RH 240 H | a | a | a | a |
| 70° C. Drying 8 H | a | b | c | b |

Table 4 shows that no significant difference in the formation of the crack is found between the sample of Example 2 and samples of Comparative Examples 4, 5 and 6, when the samples are stored at high temperature conditions such as 60° C. and 90% relative humidity for 240 hours but during the storage at 70° C. (drying), the sample of Example 2 of the present invention has only formed no crack.

Example C

Samples of Example C are of Example 3 and of Comparative Examples 7, 8 and 9. Table 5 shows materials for substrates and antireflection films, film thickness and film structures.

TABLE 5

| | Example 3 PMMA | | | Comparative Example 7 PMMA | | | Comparative Example 8 PMMA | | | Comparative Example 9 PMMA | | |
|---|---|---|---|---|---|---|---|---|---|---|---|---|
| | Material | Optical Thickness | Refractive Index | Material | Optical Thickness | Refractive Index | Material | Optical Thickness | Refractive Index | Material | Optical Thickness | Refractive Index |
| First Film | $Ta_2O_5$ (97 wt %) $TiO_2$ (3 wt %) | $0.055\lambda_0$ | 2.02 | $Ta_2O_5$ | $0.055\lambda_0$ | 2.00 | $TiO_2$ | $0.055\lambda_0$ | 2.15 | $ZrO_2$ | $0.055\lambda_0$ | 1.82 |
| Second Film | $SiO_2$ | $0.145\lambda_0$ | 1.46 | $SiO_2$ | $0.145\lambda_0$ | 1.46 | $SiO_2$ | $0.145\lambda_0$ | 1.46 | $SiO_2$ | $0.135\lambda_0$ | 1.46 |
| Third Film | $Ta_2O_5$ (97 wt %) $TiO_2$ (3 wt %) | $0.125\lambda_0$ | 2.02 | $Ta_2O_5$ | $0.125\lambda_0$ | 2.00 | $TiO_2$ | $0.125\lambda_0$ | 2.15 | $ZrO_2$ | $0.155\lambda_0$ | 1.82 |
| Fourth Film | $SiO_2$ | $0.320\lambda_0$ | 1.46 | $SiO_2$ | $0.320\lambda_0$ | 1.46 | $SiO_2$ | $0.320\lambda_0$ | 1.46 | $SiO_2$ | $0.320\lambda_0$ | 1.46 |

Note: Design wavelength $\lambda_0 = 510$ nm

Test

Figure 5:
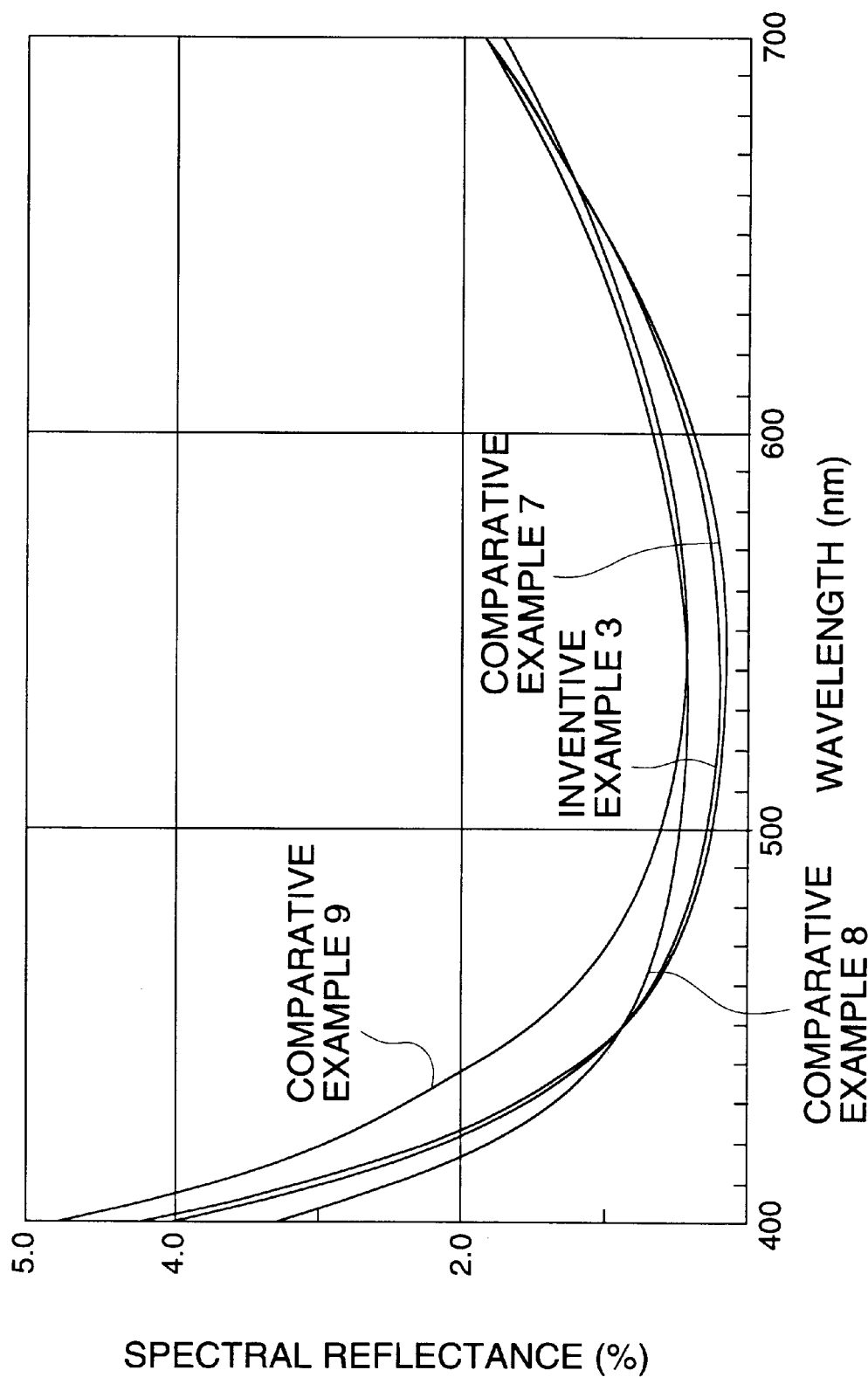
FIG. 5 shows the spectral reflectance of the optical member having the antireflection film of Example C.

Table 6 shows results on the above-mentioned samples. Furthermore, FIG. 5 illustrates antireflection characteristics (spectral reflectance) measured by a spectrophotometer.

TABLE 6

| | Example 3 | Comparative Example 7 | Comparative Example 8 | Comparative Example 9 |
|---|---|---|---|---|
| 60° C. 90% RH 240 H | a | a | c | a |
| 70° C. Drying 8 H | a | c | c | c |

Table 6 shows that no significant difference in the formation of the crack is found between the sample of Example 3 and samples of Comparative Examples 7, 8 and 9, when the samples are stored at high temperature conditions such as 60° C. and 90% relative humidity for 240 hours but during the storage at 70° C. (drying), the sample of Example 3 of the present invention has only formed no crack.

Example D

Samples of Example D are of Example 4 and of Comparative Examples 10, 11 and 12. Table 7 shows materials for substrates and antireflection films, film thickness and film structures.

TABLE 7

| | Example 4 PMMA | | | Comparative Example 10 PMMA | | | Comparative Example 11 PMMA | | | Comparative Example 12 PMMA | | |
|---|---|---|---|---|---|---|---|---|---|---|---|---|
| | Material | Optical Thickness | Refractive Index | Material | Optical Thickness | Refractive Index | Material | Optical Thickness | Refractive Index | Material | Optical Thickness | Refractive Index |
| First Film | $TaO_2O_5$ (97 wt %) $TiO_2$ (3 wt %) | $0.135\lambda_0$ | 2.02 | $Ta_2O_5$ | $0.135\lambda_0$ | 2.00 | $TiO_2$ | $0.135\lambda_0$ | 2.15 | $ZrO_2$ | $0.135\lambda_0$ | 1.82 |
| Second Film | $SiO_2$ | $0.06\lambda_0$ | 1.46 | $SiO_2$ | $0.06\lambda_0$ | 1.46 | $SiO_2$ | $0.06\lambda_0$ | 1.46 | $SiO_2$ | $0.06\lambda_0$ | 1.46 |
| Third Film | $Ta_2O_5$ (97 wt %) $TiO_2$ (3 wt %) | $0.265\lambda_0$ | 2.02 | $Ta_2O_5$ | $0.265\lambda_0$ | 2.00 | $TiO_2$ | $0.265\lambda_0$ | 2.15 | $ZrO_2$ | $0.265\lambda_0$ | 1.82 |
| Fourth Film | $MgF_2$ | $0.265\lambda_0$ | 1.38 | $MgF_2$ | $0.265\lambda_0$ | 1.38 | $MgF_2$ | $0.265\lambda_0$ | 1.38 | $MgF_2$ | $0.265\lambda_0$ | 1.38 |

Note: Design wavelength $\lambda_0$ = 510 nm

Test

Figure 6:
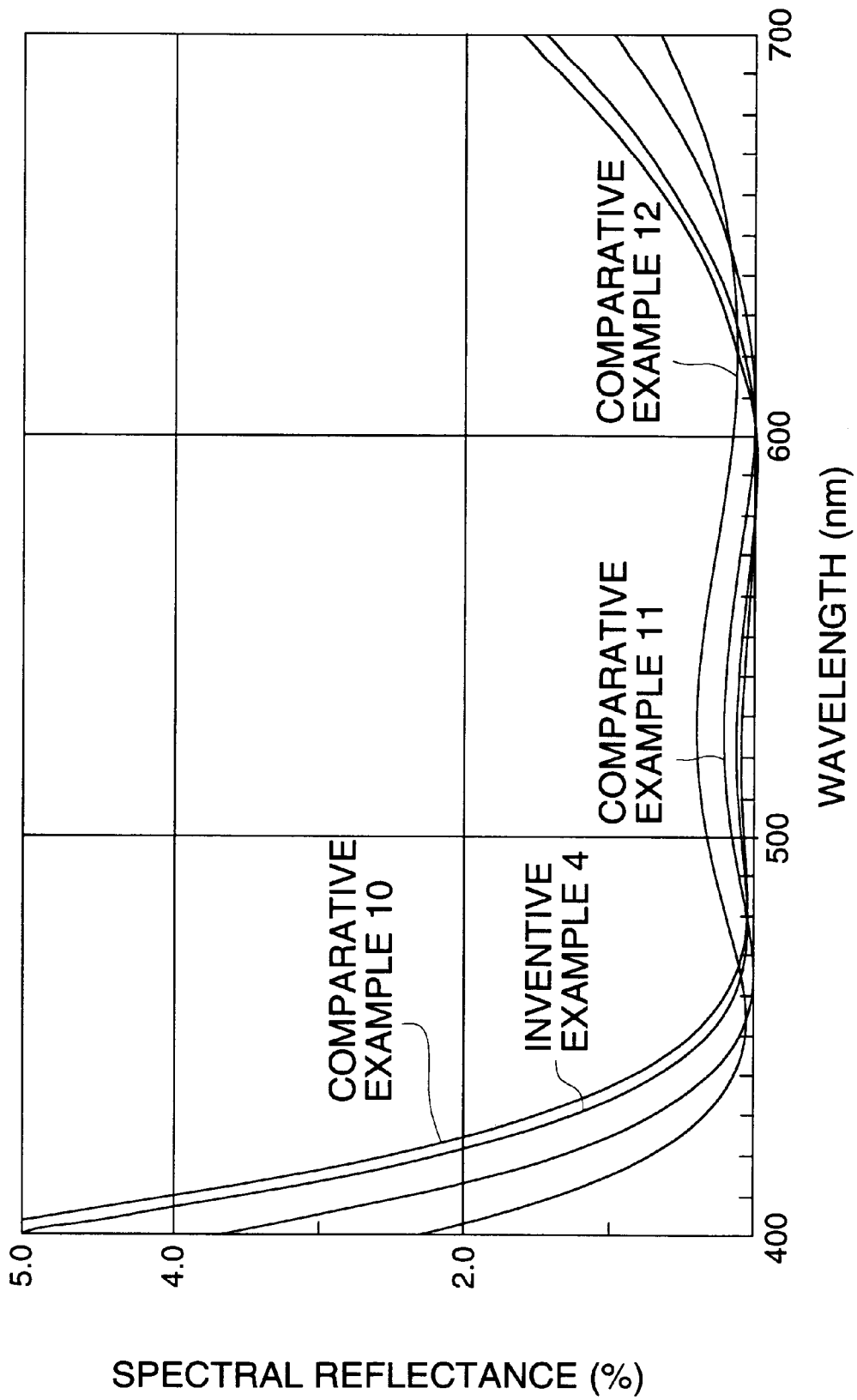
FIG. 6 shows the spectral reflectance of the optical member having the antireflection film of Example D.

Table 8 shows results on the above-mentioned samples. Furthermore, FIG. 6 illustrates antireflection characteristics (spectral reflectance) measured by a spectrophotometer.

TABLE 8

| | Example 4 | Comparative Example 10 | Comparative Example 11 | Comparative Example 12 |
|---|---|---|---|---|
| 60° C. 90% RH 240 H | a | a | c | a |
| 70° C. Drying 8 H | a | c | c | c |

Table 8 shows that no significant difference in the formation of the crack is found between the sample of Example 4 and samples of Comparative Examples 10, 11 and 12, when the samples are stored at high temperature conditions such as 60° C. and 90% relative humidity for 240 hours but during the storage at 70° C. (drying), the sample of Example 3 of the present invention has only formed no crack.

Samples of Example E are of Example 5 and of Comparative Examples 13, 14 and 15. Table 9 shows materials for substrates and antireflection films, film thickness and film structures.

TABLE 9

| | Example 5 PMMA | | | Comparative Example 13 PMMA | | | Comparative Example 14 PMMA | | | Comparative Example 15 PMMA | | |
|---|---|---|---|---|---|---|---|---|---|---|---|---|
| | Material | Optical Thickness | Refractive Index | Material | Optical Thickness | Refractive Index | Material | Optical Thickness | Refractive Index | Material | Optical Thickness | Refractive Index |
| First Film | $SiO_2$ | $0.50\lambda_0$ | 1.46 | $SiO_2$ | $0.50\lambda_0$ | 1.46 | $SiO_2$ | $0.50\lambda_0$ | 1.46 | $SiO_2$ | $0.50\lambda_0$ | 1.46 |
| Second Film | $Ta_2O_5$ (97 wt %) $TiO_2$ (3 wt %) | $0.055\lambda_0$ | 2.02 | $Ta_2O_5$ | $0.055\lambda_0$ | 2.00 | $TiO_2$ | $0.055\lambda_0$ | 2.15 | $ZrO_2$ | $0.075\lambda_0$ | 1.82 |
| Third Film | $SiO_2$ | $0.145\lambda_0$ | 1.46 | $SiO_2$ | $0.145\lambda_0$ | 1.46 | $SiO_2$ | $0.145\lambda_0$ | 1.46 | $SiO_2$ | $0.106\lambda_0$ | 1.46 |
| Fourth Film | $Ta_2O_5$ (97 wt %) $TiO_2$ (3 wt %) | $0.125\lambda_0$ | 2.02 | $Ta_2O_5$ | $0.125\lambda_0$ | 2.00 | $TiO_2$ | $0.125\lambda_0$ | 2.15 | $ZrO_2$ | $0.207\lambda_0$ | 1.82 |
| Fifth Film | $SiO_2$ | $0.320\lambda_0$ | 1.46 | $SiO_2$ | $0.320\lambda_0$ | 1.46 | $SiO_2$ | $0.320\lambda_0$ | 1.46 | $SiO_2$ | $0.293\lambda_0$ | 1.46 |

Note: Design wavelength $\lambda_0$ = 510 nm

Test

Figure 7:
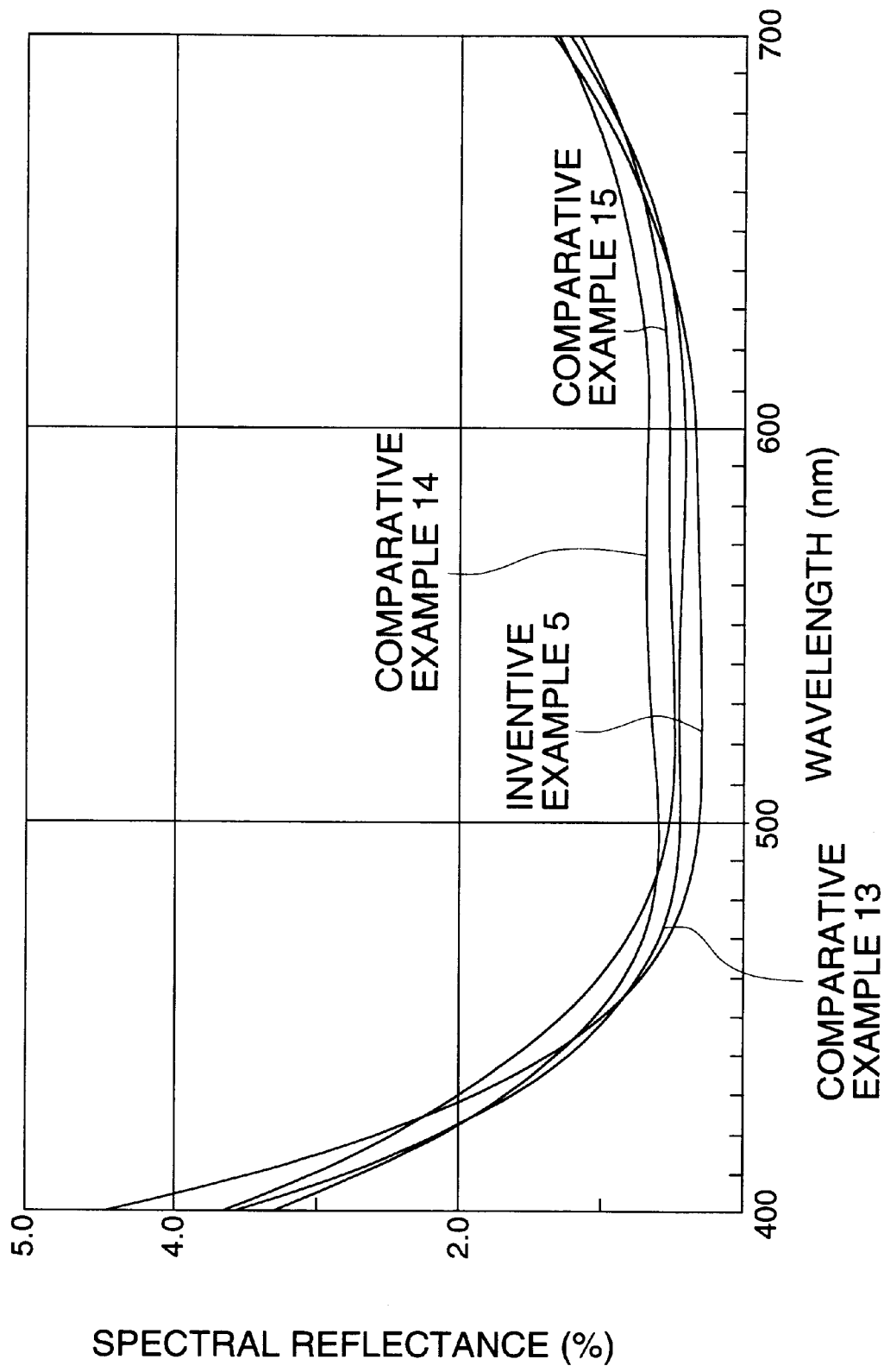
FIG. 7 shows the spectral reflectance of the optical member having the antireflection film of Example E.

Table 10 shows results on the aforesaid samples. Furthermore, FIG. 7 illustrates antireflection characteristics (spectral reflectance) measured by a spectrophotometer.

TABLE 10

|  | Example 5 | Comparative Example 13 | Comparative Example 14 | Comparative Example 15 |
|---|---|---|---|---|
| 60° C. 90% RH 240 H | a | a | c | a |
| 70° C. Drying 8 H | a | c | c | c |

Table 10 shows that no significant difference in the formation of the crack is found between the sample of Example 4 and samples of Comparative Examples 13, 14 and 15, when the samples are stored at high temperature conditions such as 60° C. and 90% relative humidity for 240 hours but during the storage at 70° C. (drying), the sample of Example 3 of the present invention has only formed no crack.

Example F

Samples of Example F are of Example 6 and of Comparative Examples 16, 17 and 18. Table 11 shows materials for substrates and antireflection films, film thickness and film structures.

Test

Figure 8:
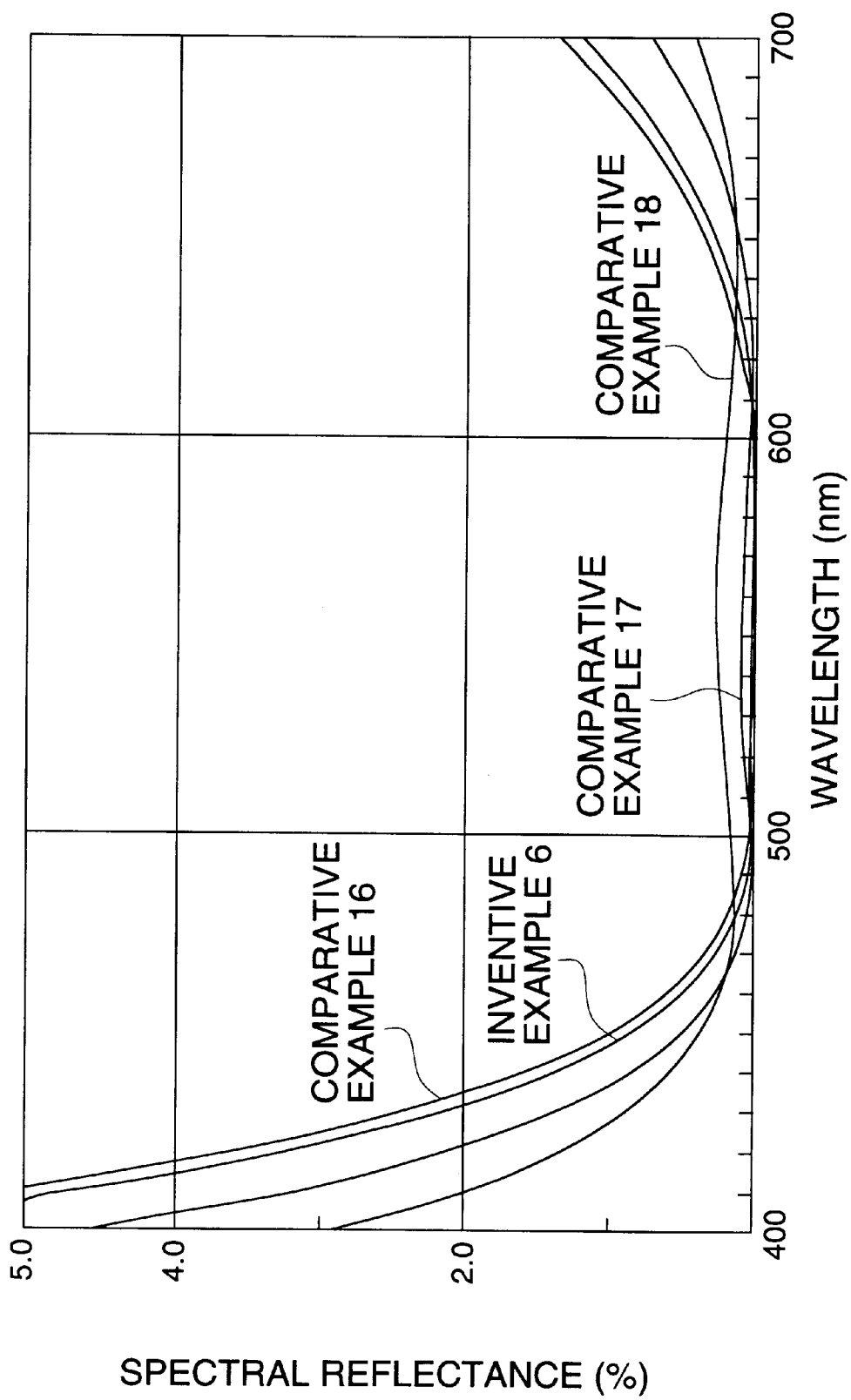
FIG. 8 shows the spectral reflectance of the optical member having the antireflection film of Example F.

Table 12 shows results on the aforesaid samples. Furthermore, FIG. 8 illustrates antireflection characteristics (spectral reflectance) measured by a spectrophotometer.

TABLE 12

|  | Example 6 | Comparative Example 16 | Comparative Example 17 | Comparative Example 18 |
|---|---|---|---|---|
| 60° C. 90% RH 240 H | a | a | c | a |
| 70° C. Drying 8 H | a | c | c | c |

Table 12 shows that no significant difference in the formation of the crack is found between the sample of Example 7 and samples of Comparative Examples 16, 17 and 18, when the samples are stored at high temperature conditions such as 60° C. and 90% relative humidity for 240 hours but during the storage at 70° C. (drying), the sample of Example 3 of the present invention has only formed no crack.

Example G

Samples of Example G are of Example 7 and of Comparative Examples 19, 20 and 21. Table 13 shows materials for substrates and antireflection films, film thickness and film structures.

TABLE 11

|  | Example 6 PMMA | | | Comparative Example 16 PMMA | | | Comparative Example 17 PMMA | | | Comparative Example 18 PMMA | | |
|---|---|---|---|---|---|---|---|---|---|---|---|---|
|  | Material | Optical Thickness | Refractive Index | Material | Optical Thickness | Refractive Index | Material | Optical Thickness | Refractive Index | Material | Optical Thickness | Refractive Index |
| First Film | $SiO_2$ | $0.500\lambda_0$ | 1.46 | $SiO_2$ | $0.500\lambda_0$ | 1.46 | $SiO_2$ | $0.500\lambda_0$ | 1.46 | $SiO_2$ | $0.500\lambda_0$ | 1.46 |
| Second Film | $Ta_2O_5$ (97 wt %) $TiO_2$ (3 wt %) | $0.120\lambda_0$ | 2.02 | $Ta_2O_5$ | $0.120\lambda_0$ | 2.00 | $TiO_2$ | $0.120\lambda_0$ | 2.15 | $ZrO_2$ | $0.120\lambda_0$ | 1.82 |
| Third Film | $SiO_2$ | $0.065\lambda_0$ | 1.46 | $SiO_2$ | $0.065\lambda_0$ | 1.46 | $SiO_2$ | $0.065\lambda_0$ | 1.46 | $SiO_2$ | $0.065\lambda_0$ | 1.46 |
| Fourth Film | $Ta_2O_5$ (97 wt %) $TiO_2$ (3 wt %) | $0.290\lambda_0$ | 2.02 | $Ta_2O_5$ | $0.290\lambda_0$ | 2.00 | $TiO_2$ | $0.290\lambda_0$ | 2.15 | $ZrO_2$ | $0.290\lambda_0$ | 1.82 |
| Fifth Film | $MgF_2$ | $0.270\lambda_0$ | 1.38 | $MgF_2$ | $0.270\lambda_0$ | 1.38 | $MgF_2$ | $0.270\lambda_0$ | 1.38 | $MgF_2$ | $0.270\lambda_0$ | 1.38 |

Note: Design wavelength $\lambda_0$ = 510 nm

TABLE 13

|  | Example 7 PMMA | | | Comparative Example 19 PMMA | | | Comparative Example 20 PMMA | | | Comparative Example 21 PMMA | | |
|---|---|---|---|---|---|---|---|---|---|---|---|---|
|  | Material | Optical Thickness | Refractive Index | Material | Optical Thickness | Refractive Index | Material | Optical Thickness | Refractive Index | Material | Optical Thickness | Refractive Index |
| First Film | $Al_2O_3$ | $0.10\lambda_0$ | 1.60 | $Al_2O_3$ | $0.10\lambda_0$ | 1.60 | $Al_2O_3$ | $0.10\lambda_0$ | 1.60 | $Al_2O_3$ | $0.10\lambda_0$ | 1.60 |
| Second Film | $SiO_2$ | $0.50\lambda_0$ | 1.46 | $SiO_2$ | $0.50\lambda_0$ | 1.40 | $SiO_2$ | $0.50\lambda_0$ | 1.46 | $SiO_2$ | $0.50\lambda_0$ | 1.46 |
| Third Film | $Ta_2O_5$ (97 wt %) $TiO_2$ (3 wt %) | $0.135\lambda_0$ | 2.02 | $Ta_2O_5$ | $0.135\lambda_0$ | 2.00 | $TiO_2$ | $0.135\lambda_0$ | 2.15 | $ZrO_2$ | $0.135\lambda_0$ | 1.82 |
| Fourth Film | $SiO_2$ | $0.065\lambda_0$ | 1.46 | $SiO_2$ | $0.05\lambda_0$ | 1.46 | $SiO_2$ | $0.05\lambda_0$ | 1.46 | $SiO_2$ | $0.05\lambda_0$ | 1.46 |
| Fifth Film | $Ta_2O_5$ (97 wt %) $TiO_2$ (3 wt %) | $0.265\lambda_0$ | 2.02 | $Ta_2O_5$ | $0.265\lambda_0$ | 2.00 | $TiO_2$ | $0.265\lambda_0$ | 2.15 | $ZrO_2$ | $0.265\lambda_0$ | 1.82 |
| Sixth Film | $MgF_2$ | $0.27\lambda_0$ | 1.38 | $MgF_2$ | $0.27\lambda_0$ | 1.38 | $MgF_2$ | $0.27\lambda_0$ | 1.38 | $MgF_2$ | $0.27\lambda_0$ | 1.38 |

Note: Design wavelength $\lambda_0$ = 510 nm

Test

Figure 9:
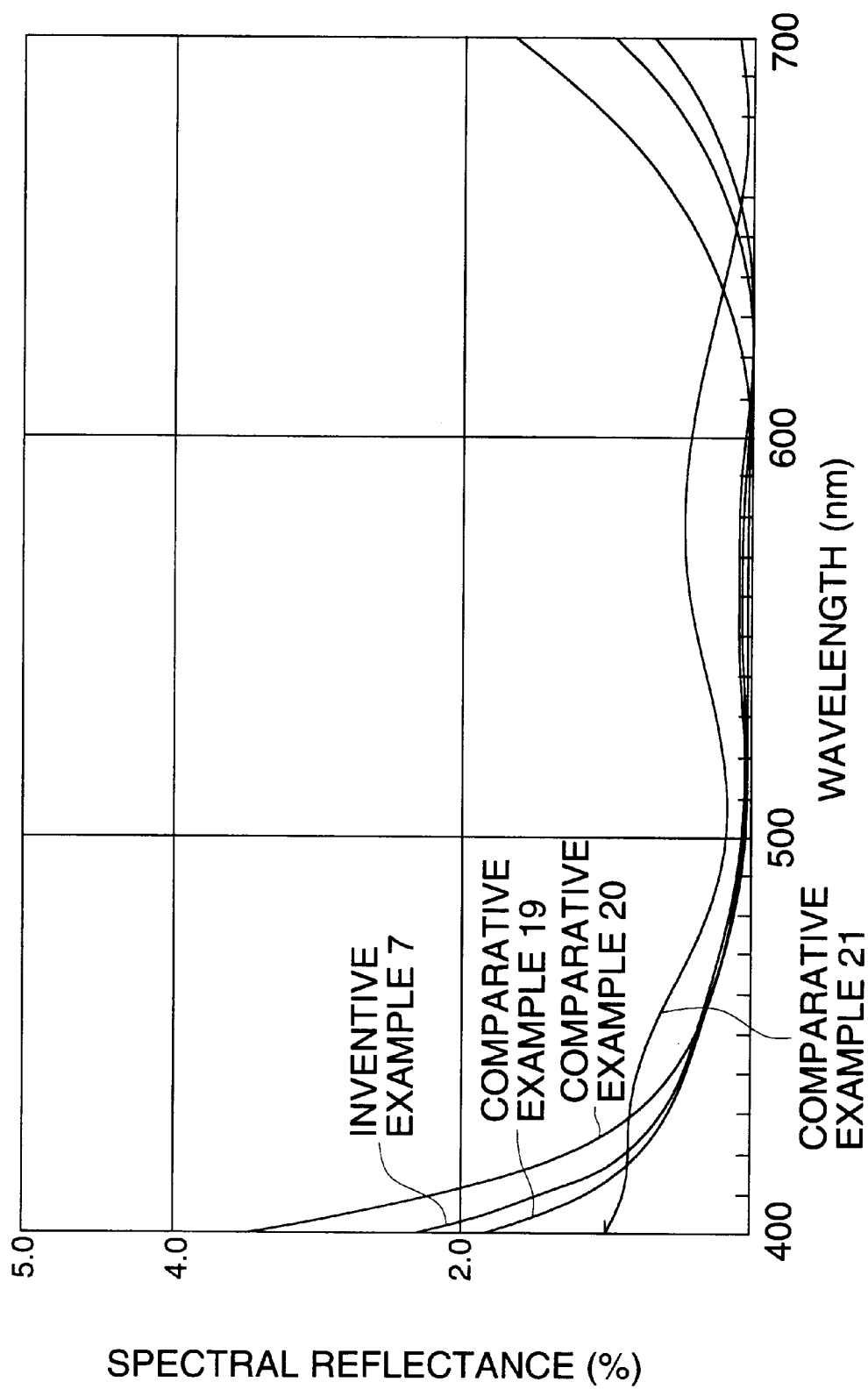
FIG. 9 shows the spectral reflectance of the optical member having the antireflection film of Example G.

Table 14 shows results on the aforesaid samples. Furthermore, FIG. 9 illustrates antireflection characteristics (spectral reflectance) measured by a spectrophotometer.

TABLE 14

|  | Example 7 | Comparative Example 19 | Comparative Example 20 | Comparative Example 21 |
|---|---|---|---|---|
| 60° C. 90% RH 240 H | a | a | c | a |
| 70° C. Drying 8 H | a | c | c | c |

Table 14 shows that no significant difference in the formation of the crack is found between the sample of Example 7 and samples of Comparative Examples 19, 20 and 21, but during the storage at 70° C. (drying), the sample of Example 7 of the present invention has only formed no crack.

Example H

Samples of Example H are of Examples 7, 8 and 9, and of Comparative Examples 22. Tables 15 and 16 show materials for substrates and antireflection films, film thickness and film structures.

TABLE 15

|  | Example 7 PMMA | | | Example 8 PMMA | | |
|---|---|---|---|---|---|---|
|  | Material | Optical Thickness | Refractive Index | Material | Optical Thickness | Refractive Index |
| First Film | $Al_2O_3$ | $0.10\lambda_0$ | 1.60 | $Al_2O_3$ | $0.10\lambda_0$ | 1.60 |
| Second Film | $SiO_2$ | $0.50\lambda_0$ | 1.46 | $SiO_2$ | $0.50\lambda_0$ | 1.46 |
| Third Film | $Ta_2O_5$ (97 wt %) $TiO_2$ (3 wt %) | $0.135\lambda_0$ | 2.02 | $Ta_2O_5$ (99.5 wt %) $TiO_2$ (0.5 wt %) | $0.135\lambda_0$ | 2.00 |
| Fourth Film | $SiO_2$ | $0.065\lambda_0$ | 1.46 | $SiO_2$ | $0.05\lambda_0$ | 1.46 |
| Fifth Film | $Ta_2O_5$ (97 wt %) $TiO_2$ (3 wt %) | $0.265\lambda_0$ | 2.02 | $Ta_2O_5$ | $0.265\lambda_0$ | 2.00 |
| Sixth Film | $MgF_2$ | $0.27\lambda_0$ | 1.38 | $MgF_2$ | $0.27\lambda_0$ | 1.38 |

Note: Design wavelength $\lambda_0$ = 510 nm

TABLE 16

| | Example 9 PMMA | | | Comparative Example 22 PMMA | | |
|---|---|---|---|---|---|---|
| | Material | Optical Thickness | Refractive Index | Material | Optical Thickness | Refractive Index |
| First Film | $Al_2O_3$ | $0.10\lambda_0$ | 1.60 | $Al_2O_3$ | $0.10\lambda_0$ | 1.60 |
| Second Film | $SiO_2$ | $0.50\lambda_0$ | 1.46 | $SiO_2$ | $0.50\lambda_0$ | 1.46 |
| Third Film | $Ta_2O_5$ (70 wt %) $TiO_2$ (30 wt %) | $0.135\lambda_0$ | 2.07 | $Ta_2O_5$ (60 wt %) $TiO_2$ (40 wt %) | $0.135\lambda_0$ | 2.09 |
| Fourth Film | $SiO_2$ | $0.05\lambda_0$ | 1.46 | $SiO_2$ | $0.05\lambda_0$ | 1.46 |
| Fifth Film | $Ta_2O_5$ (70 wt %) $TiO_2$ (30 wt %) | $0.265\lambda_0$ | 2.07 | $Ta_2O_5$ (60 wt %) $TiO_2$ (40 wt %) | $0.265\lambda_0$ | 2.09 |
| Sixth Film | $MgF_2$ | $0.27\lambda_0$ | 1.38 | $MgF_2$ | $0.27\lambda_0$ | 1.38 |

Note: Design wavelength $\lambda_0$ = 510 nm

Test

Figure 10:
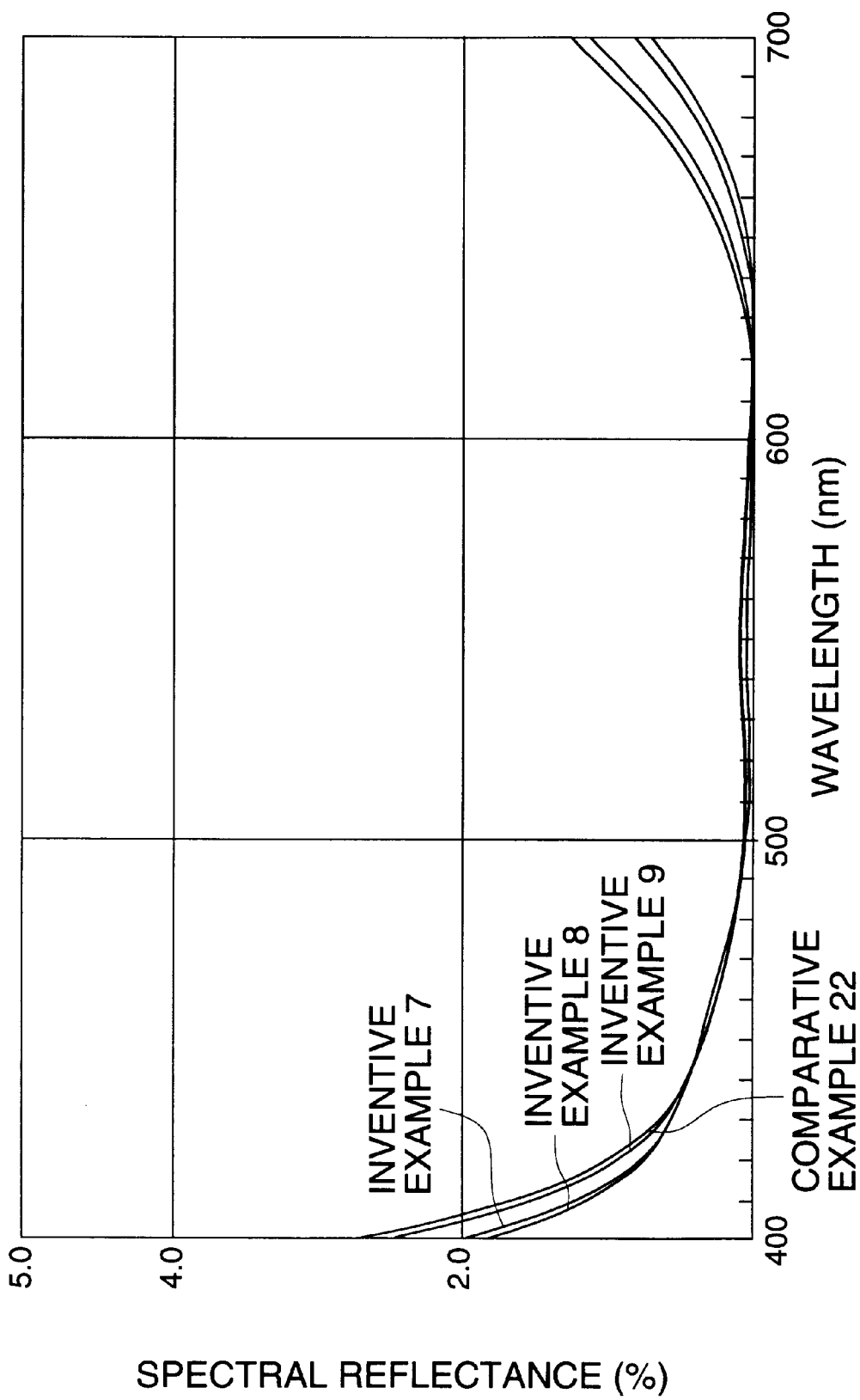
FIG. 10 shows the spectral reflectance of the optical member having the antireflection film of Example H.

Table 17 shows results on the aforesaid samples. Furthermore, FIG. 10 illustrates antireflection characteristics (spectral reflectance) measured by a spectrophotometer.

TABLE 17

| | Example 7 | Example 7 | Example 9 | Comparative Example 22 |
|---|---|---|---|---|
| 60° C. 90% RH 240 H | a | a | a | a |
| 70° C. Drying 8 H | a | a | a | c |

Table 17 shows that no significant difference in the formation of the crack is found between the sample of Examples 7, 8 and 9 and the sample of Comparative Example 22, but during the storage at 70° C. (drying), the samples of Examples 7, 8 and 9 of the present invention have only formed no crack. According to the foregoing, it has been found that in order to prevent the formation of the crack, mixing ratio of titanium oxide ($TiO_2$) will be in the range of 0.5 to 30 percent by weight.

Furthermore, test results show that when stored at 80° C. (drying), cracks are formed on Examples 8 and 9, while no crack is formed on Example 7 under this condition. Accordingly, on the use at higher temperatures, the mixing ratio of titanium oxide ($TiO_2$) is preferably from 1 to 5 percent by weight.

Further, as synthetic resins for the substrate, any of synthetic resins are available which have been used in this industry without particular limitation. Though polymethylmethacrylate (PMMA) and polycarbonates (PC) have been illustrated as representative synthetic resins, other resins are employed.

In addition, the vacuum evaporation was applied to Examples of the present invention. However, an ion plating, sputtering, etc. may be employed.

As composed above, the following advantages are effected, that is:

According to structure (1), in an optical member composed of a substrate and antireflection films, is provided the optical member which has excellent antireflection properties and is available for a high precision optical system, and is not liable to form the crack, because on the synthetic resin substrate, is arranged antireflection films having at least one mixture film consisting of tantalum oxide ($Ta_2O_3$) and titanium oxide ($TiO_2$).

According to structure (2), in an optical member having the antireflection films described in the structure (1), the crack is not liable to be formed, because in the aforesaid antireflection films, a mixture film consisting of tantalum oxide ($Ta_2O_5$) and titanium oxide ($TiO_2$) comprises from 0.5 to 30 weight percent of titanium oxide ($TiO_2$).

According to structure (3), in an optical member having the antireflection films described in the structure (1), the crack is not liable to be formed, because in the aforesaid antireflection films, a mixture film consisting of tantalum oxide ($Ta_2O_5$) and titanium oxide ($TiO_2$) comprises from 1 to 5 weight percent of titanium oxide ($TiO_2$).

According to structure (4), in an optical member having the antireflection films described in one of structures (1) to (3), the crack is not liable to be formed; antireflection properties are excellent; the cost is low and the productivity is high, because the aforesaid antireflection films are composed of two films which meet conditions described in the structure (4), while the number of the antireflection film of the optical member having the antireflection films is counted from the substrate side.

According to structure (5), in an optical member having the antireflection films described in one of the structures (1) to (3), the crack is not liable to be formed; antireflection properties are excellent; the cost is low and the productivity is high, because the aforesaid antireflection films are composed of three films described in structure (5), while the number of the antireflection film is counted from the substrate.

According to structure (6), in an optical member having the antireflection films described in one of the structures (1) to (3), the crack is-not liable to be formed; antireflection properties are excellent; the cost is low and the productivity is high because the aforesaid antireflection films are composed of four films described in structure (6), while the number of the antireflection film is counted from the substrate.

According to structure (7), in an optical member having the antireflection films described in one of the structures (1) to (3), the crack is not liable to be formed; antireflection properties are excellent; the cost is low and the productivity is high, because the aforesaid antireflection films are composed of five films described in structure (7), while the number of the antireflection film is counted from the substrate.

According to structure (8), in an optical member having the antireflection films described in one of the structures (1) to (3), the crack is not liable to be formed; the cost are low and the productivity is high, because the aforesaid antireflection films comprise at least one of mixture films consisting of tantalum oxide ($Ta_2O_5$) and titanium oxide ($TiO_2$), one of the low refractive index films and one of the intermediate refractive index films.

According to structure (9), in an optical member having the antireflection films described in one of the structures (1), (2), (3) and (8), the crack is not liable to be formed; the cost is low and the productivity is high, because the aforesaid antireflection films are composed of six films described in structure (9), while the number of the antireflection film of the optical member having the antireflection films is counted from the substrate side.

According to structure (10), in an optical member having the antireflection films described in one of the structures (4) to (9), the crack is not liable to be formed; the cost is low and the productivity is high, because the low refractive index film is composed of silicon oxide ($SiO_2$) or magnesium fluoride ($MgF_2$).

According to structure (11), in an optical member having the antireflection films described in one of the structures (8) and (9), the crack is not liable to be formed; the cost is low and the productivity is high, because the intermediate refractive index film is composed of aluminum oxide ($Al_2O_3$).

What is claimed is:

1. An optical member comprising:
   (a) a synthetic resin substrate; and
   (b) an antireflection film including at least a mixture film composed of tantalum oxide ($Ta_2O_5$) and titanium oxide ($TiO_2$), and a film having a refractive index lower than that of the mixture film, the antireflection film being coated on the synthetic resin substrate;
   wherein the antireflection film consists of, in succession from the substrate,
   a first film including the mixture film composed of tantalum oxide ($Ta_2O_5$) and titanium oxide ($TiO_2$) and satisfying the following conditions, $1.90 \leq n_1 \leq 2.10$ $0.03\lambda_0 \leq n_1 d_1 \leq 0.10\lambda_0$; and a second film having a refractive index lower than that of the mixture film, and satisfying the following conditions, $1.36 \leq n_2 \leq 1.48$ $0.28\lambda_0 \leq n_2 d_2 \leq 0.40\lambda_0$ wherein $n_i$ represents a refractive index of each of the films,
   $d_i$ represents a thickness of each of the films, and $\lambda_0$ represents a designed wavelength of a light beam to be used.

2. The optical member of claim 1, wherein the thickness of the films are satisfied the following conditions, $7 \text{ nm} \leq d_1 \leq 27 \text{ nm}$ $96 \text{ nm} \leq d_2 \leq 150 \text{ nm}$.

3. The optical member of claim 1, wherein the mixture film includes 0.5 to 30 weight percent of titanium oxide ($TiO_2$).

4. The optical member of claim 1, wherein the mixture film includes 1 to 5 weight percent of titanium oxide ($TiO_2$).

5. The optical member of claim 1, wherein the second film contains silicon oxide ($SiO_2$) or magnesium fluoride ($MgF_2$).

6. An optical member comprising:
   (a) a synthetic resin substrate; and
   (b) an antireflection film including at least a mixture film composed of tantalum oxide ($Ta_2O_5$) and titanium oxide ($TiO_2$), and a film having a refractive index lower than that of the mixture film, the antireflection film being coated on the synthetic resin substrate;
   wherein the antireflection film consists of, in succession from the substrate,
   a first film having a refractive index lower than that of the mixture film, and satisfying the following conditions, $1.36 \leq n_1 \leq 1.48$ $0.10\lambda_0 \leq n_1 d_1 \leq 0.60\lambda_0$;

a second film including the mixture film composed of tantalum oxide ($Ta_2O_5$) and titanium oxide ($TiO_2$) and satisfying the following conditions, $1.90 \leq n_2 \leq 2.10$ $0.03\lambda_0 \leq n_2 d_2 \leq 0.10\lambda_0$; and a third film having a refractive index lower than that of the mixture film, and satisfying the following conditions, $1.36 \leq n_3 \leq 1.48$ $0.28\lambda_0 \leq n_3 d_3 \leq 0.40\lambda_0$ wherein $n_i$ represents a refractive index of each of the films, $d_i$ represents a thickness of each of the films, and $\lambda_0$ represents a designed wavelength of a light beam to be used.

7. The optical member of claim 6, wherein the thickness of the films are satisfied the following conditions, $34 \text{ nm} \leq d_1 \leq 225 \text{ nm}$ $7 \text{ nm} \leq d_2 \leq 27 \text{ nm}$ $96 \text{ nm} \leq d_3 \leq 150 \text{ nm}$.

8. The optical member of claim 6, wherein the mixture film includes 0.5 to 30 weight percent of titanium oxide ($TiO_2$).

9. The optical member of claim 6, wherein the mixture film includes 1 to 5 weight percent of titanium oxide ($TiO_2$).

10. The optical member of claim 6, wherein the first or third film contains silicon oxide ($SiO_2$) or magnesium fluoride ($MgF_2$).

11. An optical member comprising:

(a) a synthetic resin substrate; and (b) an antireflection film including at least a mixture film composed of tantalum oxide ($Ta_2O_5$) and titanium oxide ($TiO_2$), and a film having a refractive index lower than that of the mixture film, the antireflection film being coated on the synthetic resin substrate;

wherein the antireflection film consists of, in succession from the substrate, a first film including the mixture film composed of tantalum oxide ($Ta_2O_5$) and titanium oxide ($TiO_2$) and satisfying the following conditions, $1.90 \leq n_1 \leq 2.10$ $0.02\lambda_0 \leq n_1 d_1 \leq 0.15\lambda_0;$ a second film having a refractive index lower than that of the mixture film, and satisfying the following conditions, $1.36 \leq n_2 \leq 1.48$ $0.03\lambda_0 \leq n_2 d_2 \leq 0.18\lambda_0;$ a third film including the mixture film composed of tantalum oxide ($Ta_2O_5$) and titanium oxide ($TiO_2$) and satisfying the following conditions, $1.90 \leq n_3 \leq 2.10$ $0.09\lambda_0 \leq n_3 d_3 \leq 0.32\lambda_0;$ a fourth film having a refractive index lower than that of the mixture film and satisfying the following conditions, $1.36 \leq n_4 \leq 1.48$ $0.22\lambda_0 \leq n_4 d_4 \leq 0.40\lambda_0$ wherein $n_i$ represents a refractive index of each of the films, $d_i$ represents a thickness of each of the films, and $\lambda_0$ represents a designed wavelength of a light beam to be used.

12. The optical member of claim 11, wherein the thickness of the films are satisfied the following conditions, $4 \text{ nm} \leq d_1 \leq 41 \text{ nm}$ $11 \text{ nm} \leq d_2 \leq 68 \text{ nm}$ $22 \text{ nm} \leq d_3 \leq 86 \text{ nm}$ $75 \text{ nm} \leq d_4 \leq 150 \text{ nm}.$ 13. The optical member of claim 11, wherein the mixture film includes 0.5 to 30 weight percent of titanium oxide ($TiO_2$).

14. The optical member of claim 11, wherein the mixture film includes 1 to 5 weight percent of titanium oxide ($TiO_2$).

15. The optical member of claim 11, wherein the second or fourth film contains silicon oxide ($SiO_2$) or magnesium fluoride ($MgF_2$).

16. An optical member comprising:

(a) a synthetic resin substrate; and (b) an antireflection film including at least a mixture film composed of tantalum oxide ($Ta_2O_5$) and titanium oxide ($TiO_2$), and a film having a refractive index lower than that of the mixture film, the antireflection film being coated on the synthetic resin substrate;

wherein the antireflection film consists of, in succession from the substrate, a first film having a refractive index lower than that of the mixture film, and satisfying the following conditions, $1.36 \leq n_1 \leq 1.48$ $0.10\lambda_0 \leq n_1 d_1 \leq 0.60\lambda_0;$ a second film including the mixture film composed of tantalum oxide ($Ta_2O_5$) and titanium oxide ($TiO_2$) and satisfying the following conditions, $1.90 \leq n_2 \leq 2.10$ $0.02\lambda_0 \leq n_2 d_2 \leq 0.15\lambda_0;$ a third film having a refractive index lower than that of the mixture film, and satisfying the following conditions, $1.36 \leq n_3 \leq 1.48$ $0.03\lambda_0 \leq n_3 d_3 \leq 0.18\lambda_0;$ a fourth film including the mixture film composed of tantalum oxide ($Ta_2O_5$) and titanium oxide ($TiO_2$) and satisfying the following conditions, $1.90 \leq n_4 \leq 2.10$ $0.09\lambda_0 \leq n_4 d_4 \leq 0.32\lambda_0;$ a fifth film having a refractive index lower than that of the mixture film, and satisfying the following conditions, $1.36 \leq n_5 \leq 1.48$ $0.22\lambda_0 \leq n_5 d_5 \leq 0.40\lambda_0$ wherein $n_i$ represents a refractive index of each of the films, $d_i$ represents a thickness of each of the films, and $\lambda_0$ represents a designed wavelength of a light beam to be used.

17. The optical member of claim 16, wherein the thickness of the films are satisfied the following conditions, $34 \text{ nm} \leq d_1 \leq 225 \text{ nm}$ $4 \text{ nm} \leq d_2 \leq 41 \text{ nm}$ $11 \text{ nm} \leq d_3 \leq 68 \text{ nm}$ $22 \text{ nm} \leq d_4 \leq 86 \text{ nm}$ $75 \text{ nm} \leq d_5 \leq 150 \text{ nm}.$ 18. The optical member of claim 16, wherein the mixture film includes 0.5 to 30 weight percent of titanium oxide ($TiO_2$).

19. The optical member of claim 16, wherein the mixture film includes 1 to 5 weight percent of titanium oxide ($TiO_2$).

20. The optical member of claim 16, wherein the first, third or fifth film contains silicon oxide ($SiO_2$) or magnesium fluoride ($MgF_2$).

21. An optical member comprising:
 (a) a synthetic resin substrate; and
 (b) an antireflection film including at least a mixture film composed of tantalum oxide ($Ta_2O_5$) and titanium oxide ($TiO_2$), and a film having a refractive index lower than that of the mixture film, the antireflection film being coated on the synthetic resin substrate;
 wherein the antireflection film consists of, in succession from the substrate,
 a first film satisfying the following conditions, $$1.58 \leq n_1 \leq 1.62$$

$$0.05\lambda_0 \leq n_1 d_1 \leq 0.30\lambda_0;$$

a second film having a refractive index lower than that of the mixture film, and satisfying the following conditions, $$1.36 \leq n_2 \leq 1.48$$

$$0.10\lambda_0 \leq n_2 d_2 \leq 0.60\lambda_0;$$

a third film including the layer of the mixture film composed of tantalum oxide ($Ta_2O_5$) and titanium oxide ($TiO_2$) and satisfying the following conditions, $$1.90 \leq n_3 \leq 2.10$$

$$0.02\lambda_0 \leq n_3 d_3 \leq 0.08\lambda_0;$$

a fourth film having a refractive index lower than that of the mixture film, and satisfying the following conditions, $$1.36 \leq n_4 \leq 1.48$$

$$0.10\lambda_0 \leq n_4 d_4 \leq 0.18\lambda_0;$$

a fifth film including the layer of the mixture film composed of tantalum oxide ($Ta_2O_5$) and titanium oxide ($TiO_2$) and satisfying the following conditions, $$1.90 \leq n_5 \leq 2.10$$

$$0.09\lambda_0 \leq n_5 d_5 \leq 0.35\lambda_0;$$

a sixth film having a refractive index lower than that of the mixture film, and satisfying the following conditions, $$1.36 \leq n_6 \leq 1.48$$

$$0.22\lambda_0 \leq n_6 d_6 \leq 0.40\lambda_0$$

wherein $n_i$ represents a refractive index of each of the films, $d_i$ represents a thickness of each of the films, and $\lambda_0$ represents a designed wavelength of light beam to be used.

22. The optical member of claim 21, wherein the thickness of the films are satisfied the following conditions, $$15 \text{ nm} \leq d_1 \leq 97 \text{ nm}$$

$$34 \text{ nm} \leq d_2 \leq 225 \text{ nm}$$

$$4 \text{ nm} \leq d_3 \leq 22 \text{ nm}$$

$$34 \text{ nm} \leq d_4 \leq 68 \text{ nm}$$

$$22 \text{ nm} \leq d_5 \leq 94 \text{ nm}$$

$$75 \text{ nm} \leq d_6 \leq 150 \text{ nm}.$$

23. The optical member of claim 21, wherein the mixture film includes 0.5 to 30 weight percent of titanium oxide ($TiO_2$).

24. The optical member of claim 21, wherein the mixture film includes 1 to 5 weight percent of titanium oxide ($TiO_2$).

25. The optical member of claim 21, wherein the second film contains silicon oxide ($SiO_2$) or magnesium fluoride ($MgF_2$).

26. The optical member of claim 21, wherein the first film contains aluminum oxide ($Al_2O_3$).

* * * * *